United States Patent Office 2,833,382
Patented May 6, 1958

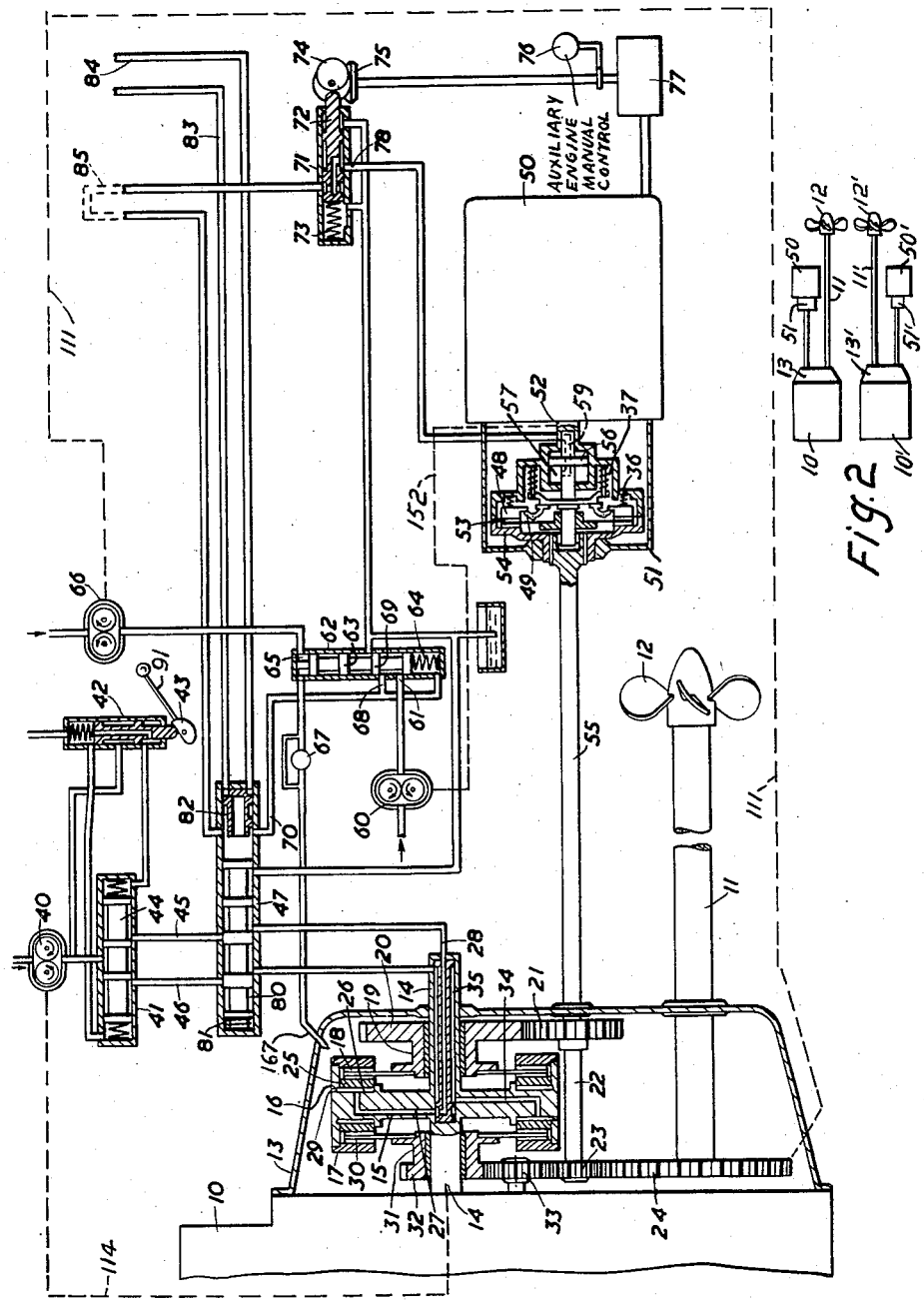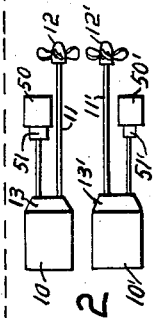

2,833,382

PROPULSION APPARATUS FOR SHIPS OR BOATS

George Hamilton Murray, Pinner, and Ernest Brook, Cleckheaton, England, assignors to D. Napier & Son Limited, London, England, a British company Application May 9, 1955, Serial No. 506,754

Claims priority, application Great Britain May 13, 1954

8 Claims. (Cl. 192—.098)

This invention relates to marine propulsion apparatus for ships or boats of the kind comprising a main propulsion engine, for example in the form of an internal combustion engine of the reciprocating or combustion turbine type, connected to the propeller through transmission mechanism including a clutch (hereinafter called the main clutch) and an auxiliary engine also capable of being connected to the propeller shaft through a clutch (hereinafter called the auxiliary clutch) and thus being capable of transmitting power to the propeller shaft, for example for manoeuvering or slow speed operation of a ship, when the main clutch is disengaged. The auxiliary engine might be an auxiliary internal combustion engine, and may be used for other purposes in addition to or alternatively to its use as an auxiliary propulsion engine, or may be an electric motor or an electric motor-generating set, which might be usable also to supply electric services in the ship, both the above arrangements having already been proposed.

An object of the invention is to provide improved control mechanism for marine propulsion apparatus of the kind referred to which will tend to ensure against damage due to mal-operation of the clutches and will generally meet the needs of installations of the kind in question.

In a marine propulsion unit for ships or boats of the kind referred to according to the present invention, the auxiliary clutch is hydraulically operated, and the unit includes a source of hydraulic pressure controlled by or responsive to the speed of rotation of the auxiliary engine, to supply fluid to operate the auxiliary clutch.

Thus connection of the auxiliary motor to the propeller shaft when that motor is stationary is automatically prevented.

The invention may be performed in various different ways but one specific embodiment will now be described by way of example with reference to the accompanying diagrammatic drawing, in which Figure 1 is a diagrammatic drawing of the components and control system of one of a pair of marine propulsion units according to the invention, and Figure 2 is a diagrammatic illustration of the main components of the two propulsion units.

The ship's propulsion apparatus in this example is of the twin-screw type, each screw or propeller being driven by a separate power unit, but for convenience only one such propeller and power unit is illustrated in Figure 1 of the drawings, the components of the second propeller unit shown in Figure 2 being given the same reference numerals with an added suffix, thus 10, 10'. Each power unit comprises a main engine 10 of the diesel type arranged to drive a propeller shaft 11 and propeller 12 through transmission gearing 13 including reversing mechanism. The gearing 13 includes an input shaft 14 connected to the crankshaft of the main engine 10, and rigidly attached to a flange member 15 which constitutes a common input member for two hydraulically operated friction clutches indicated generally at 16 and 17. The clutch 16, which is the main "ahead" clutch transmitting drive between the engine 10 and propeller 12 to drive the ship in the forward direction, includes a driven clutch plate 18 mounted on a sleeve 19 concentric with the shaft 14, this sleeve being rigidly connected to a pinion 20 which meshes with a further pinion 21 on a driven shaft 22. A second pinion 23 on the shaft 22 meshes with a pinion 24 mounted on the propeller shaft 11. An annular piston member 25 is arranged to be urged into contact with the driven clutch plate 18, by the pressure of hydraulic fluid in a chamber 26, fluid being admitted to the chamber via a radial drilling 27 in the flange member 15, and a bore 28 in the shaft 14. The chamber 26 is permanently connected to relief via a restricted bleed orifice 29, so that the clutch automatically disengages if the supply of hydraulic fluid is interrupted.

The clutch 17, which constitutes the main "astern" clutch between the main engine 10 and the propeller shaft, is identical with the main ahead clutch 16, and includes a driven clutch plate 30 mounted on a sleeve 31, which is rigidly connected to a pinion 32, driving the pinion 23 through an intermediate lay pinion 33. The supply of hydraulic fluid to operate the main astern clutch 17 is led through a radial drilling 34, and an annular conduit 35, within the shaft 14.

Thus it will be seen that by engaging one or other of the main clutches 16 or 17 the main engine 10 can be caused to drive the propeller 12 in the ahead or astern directions, while when both clutches are disengaged the main engine is disconnected from the propeller shaft.

The hydraulic fluid to operate the main "ahead" and "astern" clutches 16 and 17 is obtained from a pump 40 of the gear type, which is driven directly from the input shaft 14, this driving connection being illustrated diagrammatically by chain line 114. The output from this pump 40 is fed to the mid-point of a shuttle type selector valve 41 and also to a manually operated pilot selector valve 42. The pilot valve 42 is controlled by a cam 43, connected to the ship's main "ahead" and "astern" selector lever 91 and is arranged to connect the pressure output from the pump 40 selectively to one end or other of the shuttle valve 41. A shuttle type piston 44 within this valve moves accordingly to one end of the valve and connects the output from the pump 40 to one of two pressure lines 45, 46 which are connected respectively to the conduits 28 and 35 leading to the clutches 16 and 17, through a main clutch isolating valve 47. The isolating valve 47 acts automatically to shut off the supply of hydraulic fluid to both main clutches 16 and 17, in certain operating conditions.

The propulsion unit also includes an auxiliary engine 50 which may be coupled to the propeller shaft 11 through an auxiliary clutch 51, for slow running or manoeuvering of the ship. The auxiliary engine may be of any type, such as an internal combustion engine, or an electric motor, or an electric motor-generator unit, and in the present example the auxiliary engine will be assumed to be an electric motor of the reversible type, that is to say one which is capable of rotating in either direction.

The output shaft 52 of the auxiliary engine is connected to rotate with a driving clutch plate 53, while a driven clutch member 54 is connected to the clutch output shaft 55 which is connected to rotate with the transmission shaft 22. The auxiliary clutch 51 also includes an annular piston member 56, connected to a pressure plate 48, through rockers 49, the pressure plate being urged at all times towards the clutch plate 53 by compression springs 36. The piston member 56 is urged by springs 37 in a direction to disengage the clutch, and is controlled by the pressure of hydraulic fluid in a chamber 57 behind the piston, the hydraulic fluid being admitted to the chamber via a channel 59 formed in the shaft 52. Thus when the pressure in chamber 57 reaches a predetermined value the pressure plate 48 is permitted to move towards the clutch plate 53, and the clutch engages.

The supply of hydraulic fluid to operate the auxiliary clutch 51 is obtained from a reversible auxiliary engine pump 60 of the gear type, which is arranged to be driven directly from the output shaft 52 of the auxiliary engine (as indicated diagrammatically by chain line 152) and is of the kind which delivers pressure fluid in the same direction irrespective of its direction of rotation. The output from the auxiliary engine pump 60 is connected to a port 61 in the wall of a pressure-responsive valve 62. This valve 62 contains a piston-type valve member 63 which is acted upon at one end by a compression spring 64, and at the other end is subject to the pressure in a chamber 65 connected to the output of a "propeller" pump 66, this pump 66 being driven from the propeller shaft 11 (as indicated diagrammatically at 111), and located physically within the gear casing 13. The output from the "propeller" pump 66 is also connected through the chamber 65 to a pressure maintaining valve 67 in parallel with a small bleed passage, and thence is led to a number of nozzles 167 through which the fluid is delivered in the form of sprays or jets on to the pinions of the transmission gear 13, for lubrication purposes. Since the "propeller" pump 66 rotates with the propeller shaft 11, it will be seen that the transmission gear 13 is well lubricated, even if both main clutches 16 and 17 are disengaged, and the main engine is stationary, for example when the ship is being towed.

The port 61 in the wall of the valve 62 communicates through a neck in the valve member 63 with an outlet port 68, and the valve member 63 is formed with a land 69 arranged to close the outlet port 68 when the valve member moves against the spring 64, due to an increase in pressure within the chamber 65. The outlet port 68 is connected to a pressure line 70, which constitutes the auxiliary clutch pressure line, and this pressure line is also connected to the chamber enclosing the spring 64 so as to stabilise the action of the valve member 63, and prevent the port 68 being closed when the pressure in chamber 65 subsequently rises when the propeller shaft 11 rotates due to the transmission of power from the auxiliary engine.

The auxiliary clutch pressure line 70 leads through the main clutch isolating valve 47 to a manual control valve 71, containing a simple piston-type valve member 72 acted on at one end by a spring 73 and controlled from the other end by a cam 74, which is coupled through bevel gearing 75 to a manual control lever 76 associated with control mechanism 77 by which the auxiliary engine 50 is started and controlled. The outlet port 78 of the valve 71 is connected to the channel 59 communicating with the pressure chamber 57 of the auxiliary clutch 51.

Thus it will be seen that so long as the pressure in the chamber 65 (which depends upon the speed of rotation of the propeller pump 66) exceeds a predetermined value, corresponding to a predetermined relatively low speed of the propeller shaft 11, the output from the auxiliary engine pump 60 cannot reach the auxiliary clutch pressure line 70, so that in these conditions it is impossible to engage the auxiliary clutch 51. Moreover unless the auxiliary engine pump 60 is operating, that is to say unless the auxiliary engine 50 is rotating at a speed above a predetermined minimum, it is also impossible to engage the auxiliary clutch, since there is no pressure supply to operate the clutch. The risk of damage being done to the auxiliary engine due to the high gear ratio through the transmission 13, is therefore avoided.

The main clutch isolating valve 47 contains a simple piston-type shuttle valve member 80 which is acted upon at one end by a light spring 81 and at the other end is subject to the pressure maintained in the auxiliary clutch pressure line 70. The spring 81 normally urges the valve member away from this end of the valve chamber so that the main clutch pressure lines 45 and 46 are in direct communication with the conduits 28 and 35. If the pressure in the auxiliary clutch pressure line 70 rises above a predetermined value however the valve member 80 compresses the spring 81 and moves into the position illustrated in the drawing in which both main clutch pressure lines 45 and 46 are closed. In this condition both main clutches 16 and 17 are disengaged.

The main clutch isolating valve 47 also includes a connection with the corresponding valve (which is not illustrated) associated with the ship's second propulsion unit including the second propeller 12'. To this end the end of the valve casing 47 remote from the spring 81 contains a free piston valve member 82 which is capable of sliding within the valve chamber, and the chamber at the remote end of this free piston valve is connected through conduits 83 and 84 in series with the auxiliary clutch pressure line (corresponding to the auxiliary clutch pressure line 70 of the illustrated unit) associated with the auxiliary clutch 51' of the second propulsion unit. Thus it will be seen that the main clutch ahead and astern pressure lines 45 and 46 will both be closed in response to a rise in pressure in the auxiliary clutch pressure line 70, or to a rise in pressure in the second auxiliary clutch pressure line 83 and 84, so as to ensure that the main clutches 16 and 17 are disengaged if either of the clutch pressure lines contains pressure fluid. The section of the auxiliary clutch pressure line 70 between the main clutch isolating valve 47 and the control valve 71 is also led in series, as indicated diagrammatically by the chain lines 85, so as to exert pressure on a free piston element (not illustrated) corresponding to the member 82, and associated with the second propulsion unit, so that the second propulsion unit main clutches will also be disengaged if the pressure in either of the auxiliary clutch pressure lines rises above a predetermined value.

The cam 74 is of simple eccentric form such that when the lever 76 is moved initially a small distance to start the auxiliary engine 50 the valve piston 72 is not moved appreciably and the port 78 remains shut off from the pressure line 70. The auxiliary clutch 51 therefore remains disengaged but the auxiliary engine 50 starts and the pump 60 delivers pressure fluid to the port 61 of the valve 62. This pressure fluid can only reach the pressure line 70 if the propeller 12 and hence the pump 66 are rotating at a low speed suitable to the engagement of the auxiliary engine. When the propeller shaft speed falls to the correct predetermined value the valve member 63 moves under the influence of spring 64 and pressure fluid is then admitted to the pressure line 70, thus immediately and automatically disengaging the main clutches 16 and 17, if they have not already been disengaged by means of the pilot valve 42.

The invention thus prevents any engagement of the auxiliary engine clutch 51 unless both main clutches 16 and 17 are disengaged, and unless both the propeller shaft 11 and the auxiliary engine 50 are rotating at appropriate speeds, and thereby avoids any risk of damage to the transmission or to the auxiliary engine due to engagement of the auxiliary clutch under incorrect speed conditions.

What we claim as our invention and desire to secure by Letters Patent is:

1. A marine propulsion unit comprising a main engine and a propeller, transmission mechanism including a main clutch between the main engine and the propeller, an auxiliary engine and transmission mechanism including an auxiliary clutch between the auxiliary engine and the propeller, the auxiliary clutch including a hydraulic operating piston lying in a hydraulic chamber, and including an auxiliary engine pump driven by the auxiliary engine and constituting a source of hydraulic pressure responsive to the speed of rotation of the auxiliary engine, and an auxiliary clutch fluid pressure line between said pump and said chamber to supply pressure fluid to engage the auxiliary clutch, and a propeller driven pump constituting a second source of pressure fluid responsive to the speed of rotation of the propeller shaft, and a pressure responsive device sensitive to the pressure of this source and arranged to prevent engagement of the auxiliary clutch if the pressure exceeds some predetermined relatively low value corresponding to a relatively low speed of rotation of the propeller shaft.

2. A marine propulsion unit as claimed in claim 1 in which the pressure responsive device comprises a valve member arranged in the auxiliary clutch fluid pressure line to prevent transmission of fluid from the auxiliary engine pump to the auxiliary clutch when the speed of rotation of the propeller shaft exceeds the predetermined low value.

3. A marine propulsion unit as claimed in claim 1 in which the pressure responsive device includes stabilizing mechanism including a hydraulic piston surface in a chamber, a hydraulic connection between said chamber and the auxiliary engine pump, means which open said hydraulic connection as soon as the valve member opens to introduce the pressure fluid from said pump onto said piston surface where the pressure fluid acts on the valve in the opposite direction to the fluid pressure from the propeller driven pump so as to reduce substantially the effective pressure from the second source as soon as the valve has opened to permit flow of fluid into the auxiliary clutch pressure line.

4. A marine propulsion unit as claimed in claim 3 including a fluid delivery conduit through which at least part of the output from the pump driven by the propeller shaft is delivered to the main transmission mechanism for lubrication purposes.

5. A marine propulsion unit as claimed in claim 1 including a pressure sensitive device responsive to the pressure in the auxiliary clutch pressure line and arranged to prevent engagement of the main clutch when the pressure in the auxiliary clutch pressure line exceeds a predetermined value, to ensure that the main clutch is disengaged when the auxiliary clutch is engaged.

6. A marine propulsion unit as claimed in claim 5, in which the main clutch is hydraulically operated and in which the pressure sensitive device is in the form of a pressure responsive valve and is arranged to prevent flow of hydraulic fluid to engage the main clutch when the pressure between the auxiliary clutch pressure line exceeds the said predetermined value.

7. A marine propulsion unit as claimed in claim 6 in which the transmission mechanism between the main engine and the propeller includes reversing mechanism and a main reversing clutch, which is also hydraulically operated and in which the pressure responsive valve simultaneously prevents flow of fluid to both main clutches when the pressure between the auxiliary engine pump and the auxiliary clutch exceeds the predetermined value.

8. A marine propulsion unit as claimed in claim 5 in which the main clutch is hydraulically operated and including an engine driven hydraulic pump driven at a speed proportional to the speed of the main engine and supplying pressure fluid to operate said main clutch.

References Cited in the file of this patent

UNITED STATES PATENTS

| | | |
|---|---|---|
| 2,283,133 | Allen et al. | May 12, 1942 |
| 2,403,647 | Fike et al. | July 9, 1946 |
| 2,433,916 | May et al. | Jan. 6, 1948 |
| 2,627,168 | Stevens | Feb. 3, 1953 |